(12) United States Patent
Bhattacharjya (10) Patent No.: US 7,557,963 B2
(45) Date of Patent: Jul. 7, 2009

(54) LABEL AIDED COPY ENHANCEMENT

(75) Inventor: Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 589 days.

(21) Appl. No.: 11/202,720

(22) Filed: Aug. 12, 2005

(65) Prior Publication Data

US 2007/0036435 A1 Feb. 15, 2007

(51) Int. Cl.
| | |
|---|---|
| G06T 5/00 | (2006.01) |
| H04N 1/60 | (2006.01) |
| G06K 15/00 | (2006.01) |
| G06K 1/405 | (2006.01) |
| G06K 9/38 | (2006.01) |
| G06K 9/34 | (2006.01) |
| G06K 9/36 | (2006.01) |
| G06K 9/46 | (2006.01) |
| G06K 9/48 | (2006.01) |
| G06K 9/00 | (2006.01) |
| G06K 9/40 | (2006.01) |

(52) U.S. Cl. .................. 358/3.27; 358/1.9; 358/2.1; 358/3.15; 382/166; 382/167; 382/171; 382/172; 382/176; 382/232; 382/234; 382/199; 382/253; 382/260; 382/261; 382/262; 382/263; 382/264; 382/265; 382/266

(58) Field of Classification Search .................. None
See application file for complete search history.

(56) References Cited

U.S. PATENT DOCUMENTS

| | | | |
|---|---|---|---|
| 5,265,173 A | 11/1993 | Griffin et al. | |
| 5,384,648 A * | 1/1995 | Seidner et al. | ............ 358/534 |
| 5,555,556 A | 9/1996 | Ozaki | |
| 5,579,414 A | 11/1996 | Fast et al. | |
| 5,594,815 A | 1/1997 | Fast et al. | |
| 5,594,817 A | 1/1997 | Fast et al. | |
| 5,625,719 A | 4/1997 | Fast et al. | |
| 5,729,635 A | 3/1998 | Fast et al. | |
| 5,767,978 A * | 6/1998 | Revankar et al. | ............ 358/296 |
| 5,778,103 A | 7/1998 | Allan et al. | |
| 5,956,468 A | 9/1999 | Ancin | |
| 6,097,849 A | 8/2000 | Nevis | |
| 6,141,444 A | 10/2000 | Hasegawa | |
| 6,226,402 B1 | 5/2001 | Katsuyama | |
| 6,227,725 B1 | 5/2001 | Ancin et al. | |
| 6,275,304 B1 | 8/2001 | Eschbach et al. | |
| 6,621,595 B1 | 9/2003 | Fan et al. | |
| 6,701,010 B1 | 3/2004 | Katsuyama | |
| 6,701,015 B2 | 3/2004 | Fujimoto et al. | |
| 6,754,385 B2 | 6/2004 | Katsuyama | |

(Continued)

OTHER PUBLICATIONS

Pegasus Imaging Corporation, FormFix v2 Form Processing Toolkit, Product Description, Retrieved from the Internet: <URL:http://www.pegasusimaging.com/formfix.htm> Feb. 21, 2006.

(Continued)

*Primary Examiner*—Twyler L Haskins
*Assistant Examiner*—Barbara D Reinier (57) ABSTRACT

Regions within a scanned document are labeled according to content. These labeled regions allow for particular enhancement and sharpening methods to be applied. The labeled regions may be further leveraged in subsequent rendering of the scanned document on a printer or other output device and/or in storing the scanned document.

15 Claims, 8 Drawing Sheets

U.S. PATENT DOCUMENTS

| | | | |
|---|---|---|---|
| 6,757,081 B1 | 6/2004 | Fan et al. | |
| 6,785,420 B2 | 8/2004 | Yamaai | |
| 6,859,551 B2 * | 2/2005 | Ohga | 382/167 |
| 7,151,863 B1 * | 12/2006 | Bradley et al. | 382/299 |
| 2004/0017579 A1 | 1/2004 | Lim | |
| 2004/0027618 A1 | 2/2004 | Nakamura et al. | |
| 2004/0037473 A1 * | 2/2004 | Ahmed et al. | 382/254 |
| 2004/0042680 A1 | 3/2004 | Saund | |
| 2004/0174546 A1 | 9/2004 | Guleryuz | |
| 2004/0175037 A1 | 9/2004 | Guleryuz | |
| 2005/0289182 A1 | 12/2005 | Pandian et al. | |
| 2006/0228002 A1 * | 10/2006 | Zitnick et al. | 382/107 |

OTHER PUBLICATIONS

Pegasus Imaging Corporation, FormFix (.NET) Retrieved from the Internet: <URL:ftp://www.pegasusimaging.com/formsuite/FormSuiteDotNet.zip>; WinForms ScanFix5; Classes; (LineRemovalOptions Class and LineRemovalResults Class). Manual, May 11, 2007.

* cited by examiner

Non-Halftone Edges Prior to Refinement
410

440 ～

くださぃ。
(042)585
専用窓口です、
製品に関す

Non-Halftone Edges After Refinement
420

Scanned Image on Strongly Colored Paper
610

Processed Image after Label-Aided Background Estimation
620

LABEL AIDED COPY ENHANCEMENT

BACKGROUND

A. Technical Field

The present invention relates generally to the enhancement of a scanned document, and more particularly to the use of content classification labels to enhance, sharpen, or blur content within such document, and/or provide color compensation. The content labels can be exploited for subsequent high-quality rendering on a printer or other output device and/or for compressed storage.

B. Background of the Invention

A system for the digital reproduction of a document has to contend with a number of sources of error that are introduced as a result of scanning and printing operations. These errors may degrade copy quality via varying degrees of blurred edges, Moire patterns, color shifts, sensor noise, etc. The scanning errors may be caused by a number of different factors including the quality of the scanning device, the color and quality of the document, and the content and complexity of the document. Other image artifacts found in a copied document can be attributed to the printing process that was used to generate the original page (e.g., halftone and screening noise) that is being copied.

Figure 1:
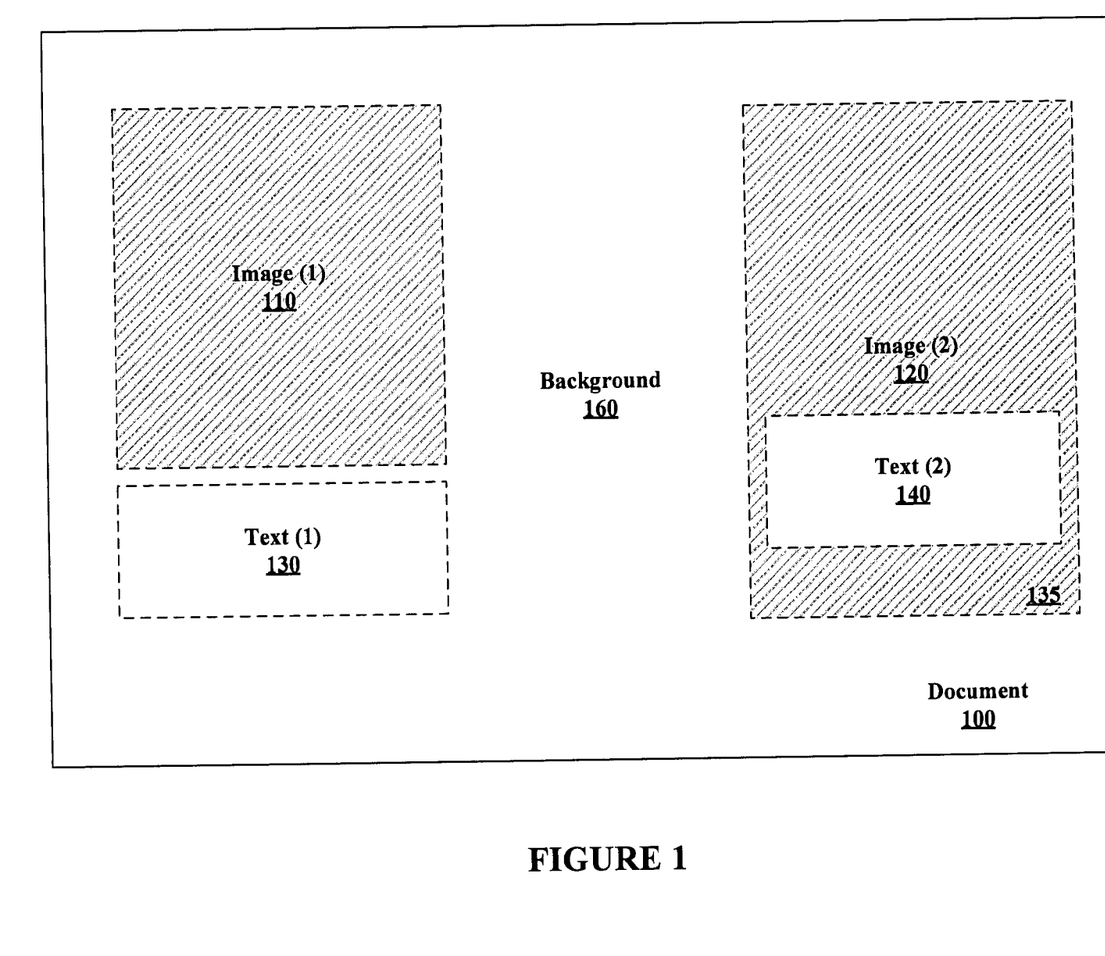
FIG. 1 is an illustration of a document having both text and image locations.

FIG. 1 illustrates an exemplary document, having different content regions, which may be copied. As shown, the document 100 has a first region 110 containing a first image, a second region 130 having text, a third region 135 containing an image 120 and text 140 integrated within the image 120, and a fourth region 160 representing the background of the document 100. Image artifacts within these regions may be generated during the scanning process of the document and handled differently depending on the content region in which the artifact is located. One example of such an image artifact is a Moire pattern, which is low frequency noise that is generated during the scanning of pages with halftones. The Moire patterns are generated by frequency aliasing between halftones within the document and the pixel grid of the scanning device. In addition to Moire patterns, other types of artifacts such as blurring may be introduced into the scanned document.

The identification of these artifacts, including image features such as halftone edges and Moire patterns, and their subsequent processing depends on the locations of different types of image regions within the document. In particular, an appropriate method for identifying and removing unwanted image artifacts may depend on whether the artifact resides in (1) an image, such as the image in the first region 110, (2) text, such as the text in the second region 130, (3) mixed text and image, such as the third region 135, or (4) the background 160.

There are sharpening and masking tools being sold on the market that enhance document copies with varying degrees of effectiveness. However, these sharpening tools may be unable to adapt effectively to the different types of image content in the document copies to compensate for different types of artifacts found within different image regions. For example, text within halftone (such as the text 140 shown in the third region 135) presents a difficult problem because edges arising out of the halftone pattern need to be suppressed while edges corresponding to text boundaries may need to be emphasized. Appropriate handling of image enhancement in this case depends on identifying the type of edge and applying region-appropriate processing.

The reproduction of an original document that has been created on colored paper may also present certain issues. Even in the ideal case, when a copier accurately reproduces all the colors in the original document, the result may not be acceptable to the end user. For example, if the original consists of a document printed on slightly yellow paper, the user may prefer to see the copy with a white background (i.e., in this case, the user prefers that the color of the paper on which the original is printed is not accurately reproduced). Similarly, if the original is printed on strongly colored paper stock, the user may prefer not to reproduce the page background color. A typical example wanting a different background is a situation in which a user has a document printed on red paper (say, a red flier), but would like the output printed on yellow paper (to make a yellow flier).

Scanned digital documents may be subsequently processed, parsed, displayed, or printed. The tools and methods required to perform these operations often depend on the type content that is being processed. For example, images may be encoded and stored using different encoding devices and algorithms as compared to those employed during the encoding of text. Furthermore, the requirements on a display device to show a color image versus text may be much different. When printed, text may be rendered with a higher frequency screen for improved rendering of spatial features, while images are better rendered with a low frequency screen to provide smoother color gradation.

Accordingly, what is needed are systems and methods for labeling content within a scanned document and enhancing the document based on the labeled content for subsequent high quality rendering.

SUMMARY OF THE INVENTION

The present invention provides label aided enhancement for subsequent high-quality copy generation or other rendering. In particular, regions within the scanned document are identified and labeled according to their particular content. This content may be text, image, background or other content known within the art and corresponding label information is leveraged to perform various enhancement and content refinement functions. For example, a region labeled as text may be enhanced using a different method as compared to a region labeled as image.

In one embodiment of the invention, regions within a scanned document are identified and labeled based on an analysis of pixel edge information within each region. Pixel gradient calculations are performed and analyzed in order to identify edge pixels within a particular region. The identified edge pixels may be further analyzed to determine an edge type for each of the edge pixels. Using this pixel edge and edge type information, regions may be tentatively identified within the scanned document according to content, such as text, image, and background regions.

In yet another embodiment of the invention, identified background regions may be used to identify the paper color of the original document and allow compensation for any page-color background manipulation operations. Other colors outside of the background region may also be remapped to maintain appropriate color relationships when the page background color is manipulated. For example, background colors, and if necessary other colors within the scanned document, may be mapped back to a preferred reference background color using various color translation and transformation methods.

In still yet another embodiment of the invention, multi-region enhancement may be performed on the scanned document. This multi-region enhancement may include a region adaptive descreening method during which unwanted halftone is removed from the scanned document, and a region dependent sharpening method in which regions are sharpened according to their content. For example, a text region may be sharpened using a standard unsharp masking algorithm.

The labeling of the scanned document may be further leveraged in both rendering and storing (e.g., region-dependent compression) the entire document or portions thereof.

BRIEF DESCRIPTION OF THE DRAWINGS

Reference will be made to embodiments of the invention, aspects of which are illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Systems and methods for enhancing a scanned document using content labels within the document are described. Color compensation methods that can be applied to the scanned document are also described. One embodiment of the present invention labels different types of content, such as images and text, within a scanned document by using gradient information present within the scanned document itself. In particular, this gradient information is used to identify and label different edge types within the scanned document. These labeled edge types may be used to subsequently identify and label content regions, within the scanned document, including background, halftone and non-halftone regions.

In a further embodiment, color compensation may be performed to properly map color clusters from the original document to the scanned document in order to maintain appropriate color relationships. For example, an original document on a colored piece of paper may be scanned and its background color mapped to a different background color to be reproduced in the document copy. Oftentimes, an end user may prefer to generate a white background copy from a document on a colored piece of paper. Other colors outside of the background may also be mapped to an appropriate color related to the preferred background of the document copy by a color transformation or translation vector.

In yet a further embodiment, multi-region enhancement may be performed to further enhance the scanned document. This multi-region enhancement may include a region adaptive descreening process and/or region dependent sharpening. The enhanced scanned document, and images therein, may be provided to various document display, printing or storage devices.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different devices including network servers, computers, and personal digital assistants. The embodiments of the present invention may also be present in software, hardware or firmware. Structures and devices shown below in block diagram are illustrative of exemplary embodiments of the invention and are meant to avoid obscuring the invention. Furthermore, connections between components and/or modules within the figures are not intended to be limited to direct connections. Rather, data between these components and modules may be modified, re-formatted or otherwise changed by intermediary components and modules.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

A. System Overview

Figure 2:
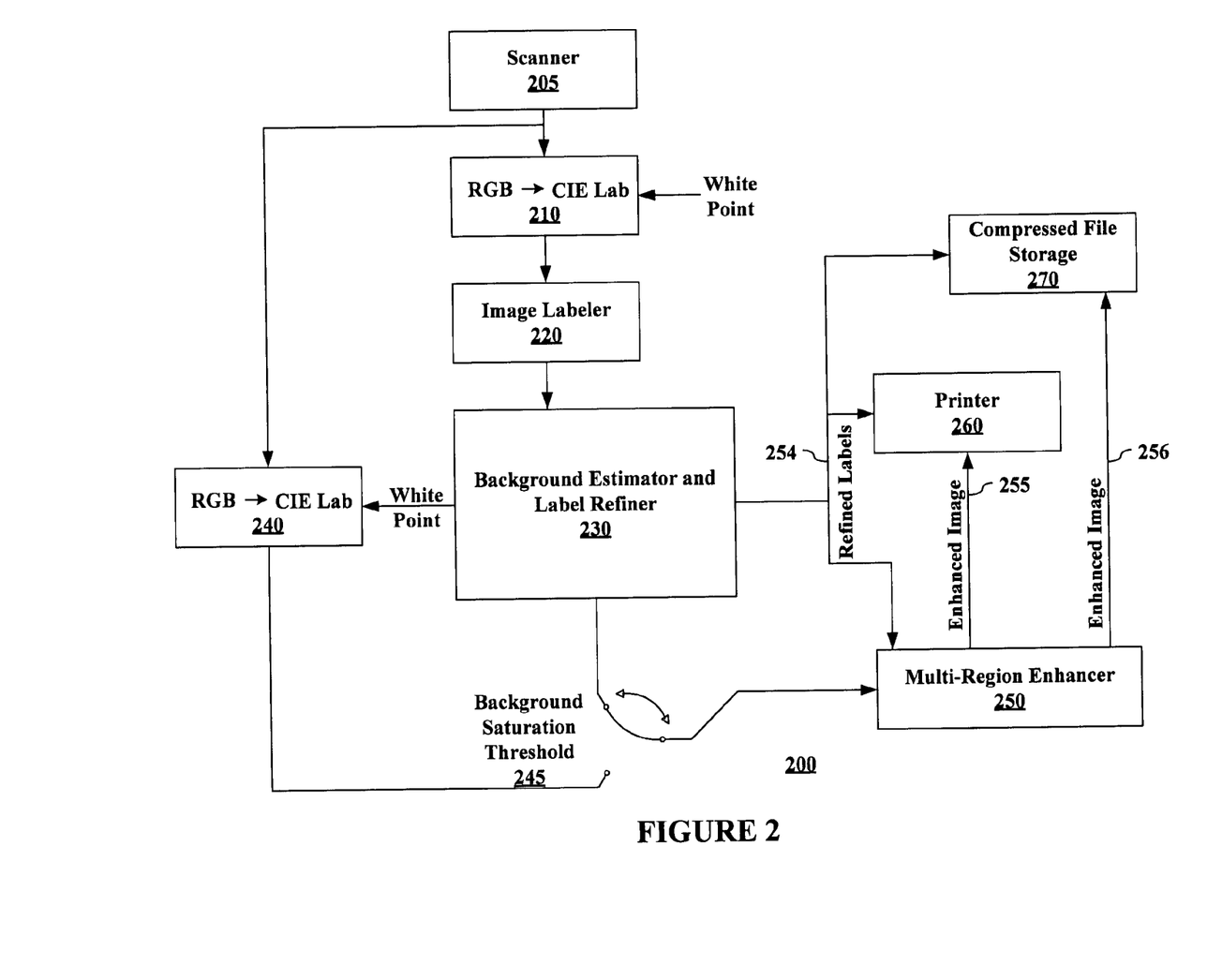
FIG. 2 is a general block diagram of a system for label aided document copy enhancement according to one embodiment of the invention.

FIG. 2 illustrates a system for document copy enhancement and color compensation according to one embodiment of the invention. Each of the components within the system will be described in greater detail in the below sections.

A scanner 205 is used to create a digital version of a hard copy document, that is, a physical medium, e.g., paper, document. Other devices, such as a printer, copier, or facsimile machine may also be used to generate a digital version of a physical document. The term "scanned document" is used herein to refer to a digital document generated from a physical document by any of these or other known means. A data converter 210, in this embodiment an RGB to CIE Lab converter, is used to convert the scanned document, which is typically captured in RGB color space, into a device-independent perceptually-uniform color space. This conversion typically employs a color profile of the scanner 205 and a white point reference color.

The device independent data of the scanned document is provided to an image labeler 220 that tentatively identifies and labels content types, such as text, images and background, within the scanned document. In identifying content types, the image labeler 220 identifies and labels edge types in the scanned document. A subsequent analysis of the amount and types of edges within a particular region is performed to tentatively label corresponding content. This labeled content and edges may be subsequently refined to improve the classification of image regions using information about other labels in the neighborhood of each label within the scanned document.

A background estimator and label refiner 230 builds a three-dimensional histogram of colors that have been marked as tentative background pixels. Using this histogram, a background color is selected and the colors in the histogram mapped to a preferred background color (e.g., a white background). A background saturation threshold 245 is used to exclude strongly saturated colors from the histogram and improve the resolution of the histogram by limiting the range of examined colors. The identification of background pixels is refined so that colors from pixels labeled as halftone are not included as background pixels.

Once the background pixels have been identified and the pixels have been labeled, a multi-region enhancer 250 further enhances the labeled document. This enhancement may include a region adaptive de-screening process and a region dependent sharpening. After the multi-region enhancement, the labeled document can be used to perform differential enhancement for viewing or printing.

In one embodiment of the invention, the labeled and enhanced document 255 is sent to a printer 260, which may require higher levels of sharpening for high-quality text as compared to, for example, text that is viewed on a computer screen. Refined label information 254 may also be used to switch between printer screens and/or color tables to improve the rendering of non-halftone edges that typically correspond to text on background regions. For example, lower frequency screens may be used over pixels labeled halftone edge or halftone to improve tone stability in devices such as color laser printers.

The labeled and enhanced document 256 may also be separated into text, line art, image layers and other content to facilitate high-compression storage by storage device 270 that may use specialized codecs for each type of content. The labeled and enhanced document may also be used to pre-process and present pertinent (text) regions to an optical character recognition system.

B. Image Labeling

Figure 3:
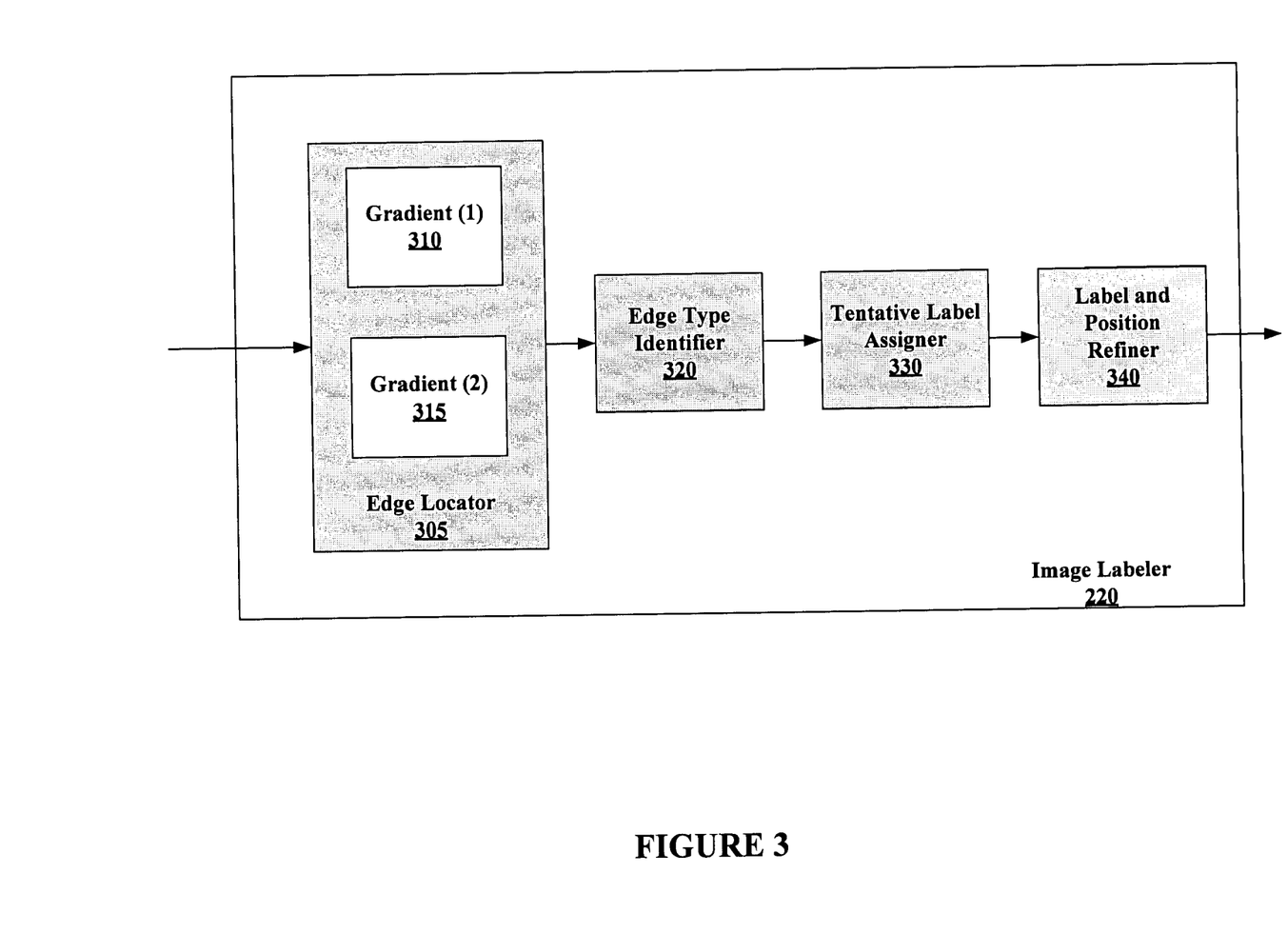
FIG. 3 is a block diagram of an image labeling module according to one embodiment of the invention.

FIG. 3 illustrates an image labeler 220 according to one embodiment of the invention. The image labeler 220 may include an edge location identifier 305, an edge type identifier 320, a tentative label assigner 330 and a label refiner 340. In one embodiment of the invention, the edge location identifier 305 comprises a first gradient module 310 and a second gradient module 315 that compute gradient values for each pixel, or at least a plurality of pixels, in the scanned document. These gradient calculations are used to identify edge pixels, which are pixels that relate to an edge of text, an image, or other content within the document copy. These edge pixels may be further characterized as fine edges, coarse edges, very coarse edges, or other types of edges and correspond to using different filter kernels for edge computation. One skilled in the art will recognize that various mathematical calculations may be performed in which edge pixels within a document copy may be identified; these various calculation methods are intended to be within the scope of this invention.

In one embodiment, the first gradient module 310 computes a first gradient value representing a horizontally-oriented edge element, for each pixel, according to:

$$h_{ij} = ((L_{i+1,j} \geq L_{ij})?1:-1) \times \|Lab_{i+1,j} - Lab_{ij}\|$$

The second gradient module 315 computes a second gradient value representing a vertically-oriented edge element, for each pixel, according to:

$$v_{ij} = ((L_{i,j+1} \geq L_{ij})?1:-1) \times \|Lab_{i,j+1} - Lab_{ij}\|$$

where $Lab_{ij}$ denotes the CIE Lab color at pixel (i,j), and $\|\ \|$ denotes the $L^2$ norm. A threshold is defined to which a comparison is made in order to identify edge pixels. For example, consider an edge threshold of $t_e$, a pixel (i,j) is identified an edge pixel if one of the following is true:

$$((abs(h_{ij}) > t_e)\hat{\ }(h_{ij} > 0)), \quad (1)$$

$$((abs(h_{i-1,j}) > t_e)\hat{\ }(h_{i-1,j} < 0)), \quad (2)$$

$$((abs(v_{ij}) > t_e)\hat{\ }(v_{ij} > 0)), \text{ or} \quad (3)$$

$$((abs(v_{i,j-1}) > t_e)\hat{\ }(v_{i,j-1} < 0)) \quad (4)$$

where abs(x) denotes the absolute value of x.

By comparing the calculated pixel gradients, within the scanned document, to each of the four criteria, edge pixels are identified.

The edge type identifier 320 identifies a type of edge for each of the identified edge pixels. According to one embodiment of the invention, two low-pass filters are used on the gradient pixels in order to identify different types of edges associated with the pixels. These low-pass filters process a particular region in order to identify edges within a region and ascertain a type of edge for each of the identified edges. By using multiple filters on the pixels, a relatively more complete capture of pixel information and edge information is provided. In one embodiment of the invention, edges may be defined at three different levels to be fine edges, coarse edges and very coarse edges. The fine edges provide well localized edges with relatively sharp boundaries. The coarse and very coarse edges are typically the result from halftones from true-image feature edges and generally provide poor information about edge location and fine-detail information about the edge itself. The edge type identification module 320 labels each of the edge pixels according to its identified type.

The tentative label assigner 330 estimates tentative halftone and background regions within the scanned document. According to one embodiment, this estimation is performed by analyzing the fine edges identified by the edge type identifier 320. In particular, the number or quantity of identified fine edges is compared to a threshold value, and if the number of fine edges within a particular region is below the threshold, the region is tentatively labeled as background. These tentatively labeled background regions may be later refined based on a color histogram analysis of labeled background pixels, within the region, to identify which pixels actually correspond to the document background.

The tentative label assigner 330 may also identify tentative halftone pixels based on an analysis of identified fine edges. In one embodiment, the identified fine edges are compared to another threshold value, and if the number of fine edges within a region around an edge pixel exceeds the threshold, the edge pixel is tentatively labeled as a halftone edge. Content labeling may also include an analysis of coarse and very coarse edges. For example, if a coarse edge exists in a tentative background area, the edge is labeled as a non-halftone edge. If a very coarse edge exists in a tentative halftone area, the edge is labeled as a halftone edge.

The label and position refiner 340 refines the labels within the scanned document by analyzing tentatively labeled edges within a particular region. In one embodiment of the invention, tentative labels are refined according to the following parameters:

(a) if a connected set of non-halftone edge pixels is adjacent to a halftone edge pixel, all the pixels in the connected set are relabeled as halftone edges, or vice versa;

(b) non-halftone edges are refined to obtain edges of higher location accuracy; and (c) halftone edge components that are below a particular size are relabeled as halftone pixels.

The label and position refiner 340 may also refine the position of non-halftone edges. According to one embodiment, non-halftone position is refined according to the following parameters:

(a) determine fine edge components that have a partial overlap with a non-halftone edge component; and (b) replace the entire non-halftone edge component, which has a partial overlap with a fine edge component and do not overlap a halftone edge component, with a corresponding set of fine edge components.

These fine edge components are labeled as non-halftone edges. Because the fine edges have higher location accuracy, the location of the non-halftone edges is dramatically improved.

Figure 4:
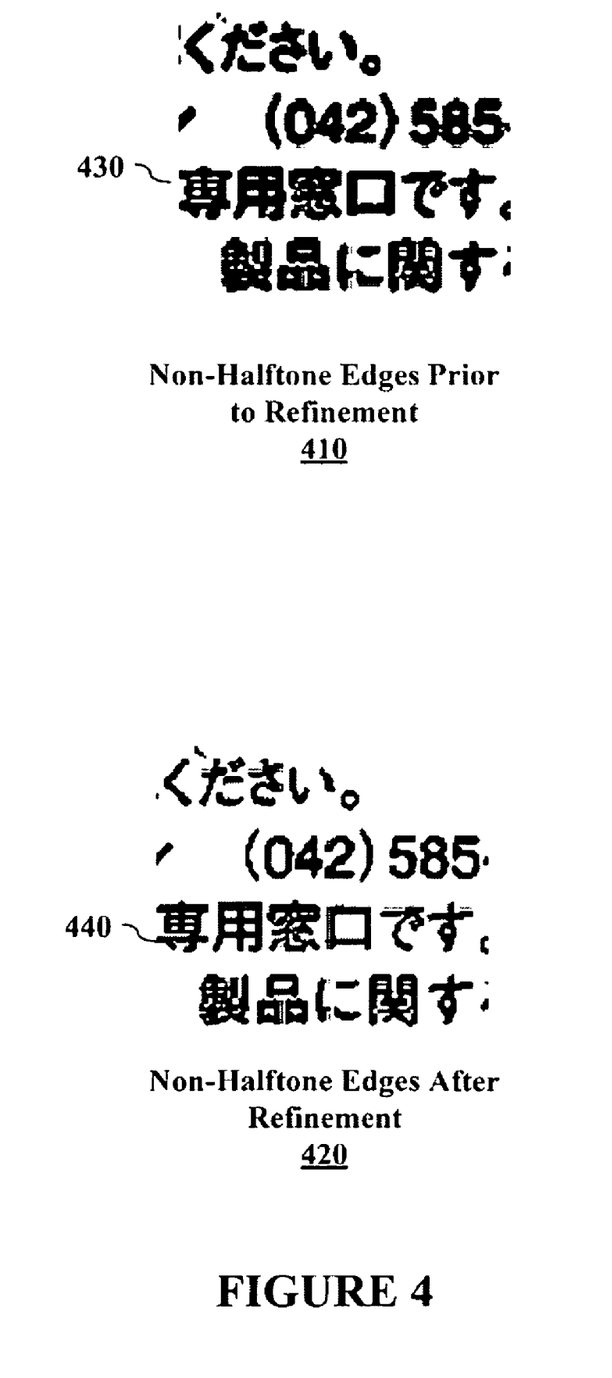
FIG. 4 is illustrations of non-halftone edges prior to and after refinement according to one embodiment of the invention.

FIG. 4 illustrates an exemplary result of the above-described label and position refinement. Non-halftone edges, prior to refinement, 410 are shown and characters 430 therein appear thick and imprecise. Comparatively, after refinement, non-halftone edges 420 are shown and characters 440 therein are much more precise because of the superior location accuracy of the character fine edges that replaced the coarse non-halftone edges.

C. Background Estimation and Label Refinement

Figure 5:
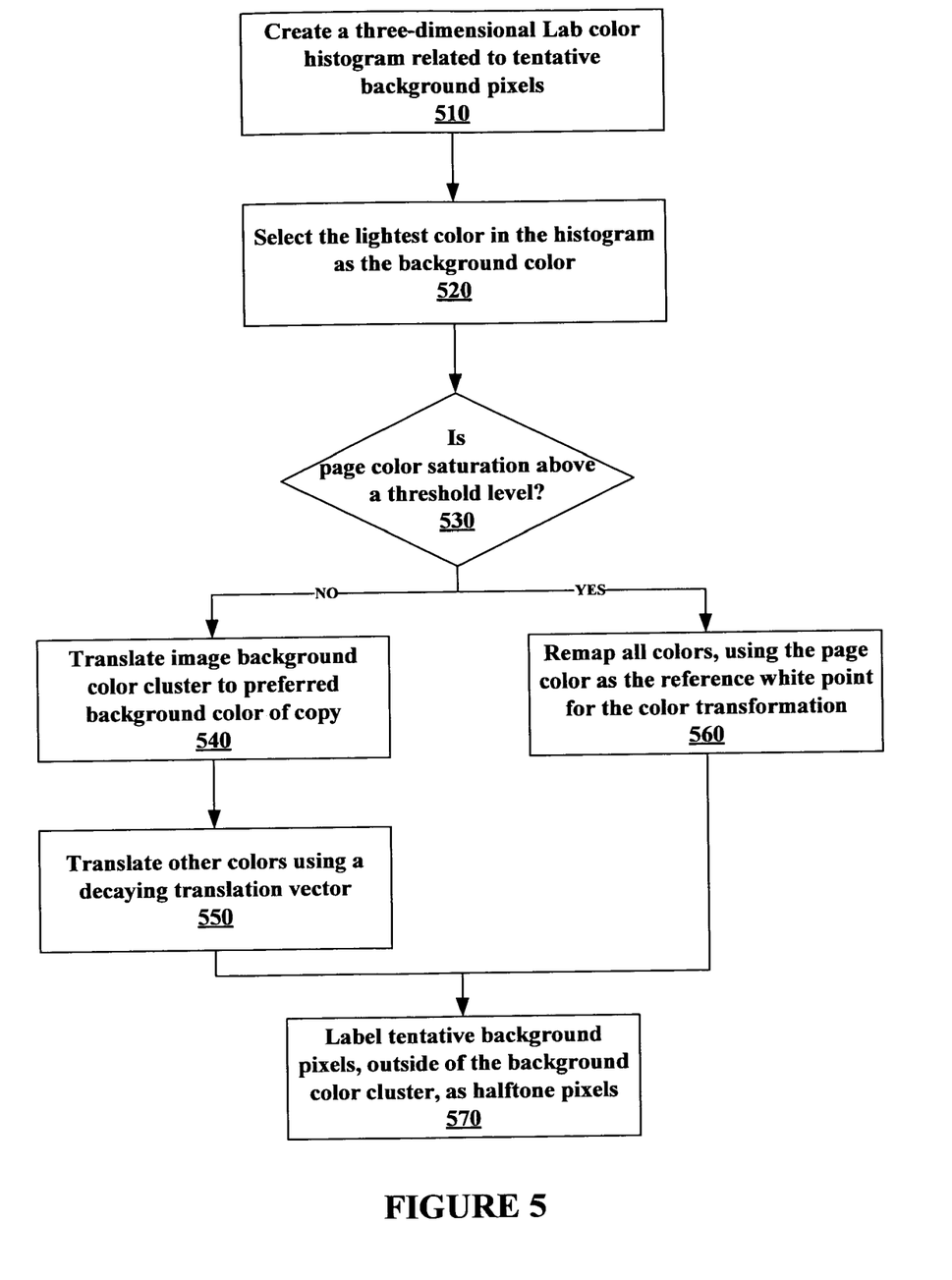
FIG. 5 is a flowchart illustrating a method for background estimation and label refinement according to one embodiment of the invention.

FIG. 5 is a flowchart illustrating a method for background estimation and label refinement according to one embodiment of the invention. As described above, an analysis of fine edges in a scanned document provides tentative labeling of background pixels. These tentative background pixels may be refined and their color appropriately modified by mapping the background color within the original document to a preferred color space for the scanned document, such as one related to a white background.

A three-dimensional color histogram in a device-independent format, such as CIE Lab, may be generated 510 for all of the colors that have been marked as tentative background pixels. One skilled in the art will recognize that various color histograms may be generated in accordance with the present invention.

In this embodiment, the lightest color peak within the three-dimensional color histogram is selected 520 as the color corresponding to the background of the document. This selected color peak may be analyzed to identify an appropriate method to map the remaining colors within the background color cluster and/or remaining colors within the scanned document to a color space corresponding to a preferred background color for the document copy. For example, the selected lightest color peak, or page color saturation, may be compared 530 to a particular threshold to identify the extent of the color distance between the background color cluster of the scanned document and the preferred color background of the document copy.

If the page color saturation is below the particular threshold, the image colors may be remapped by translating 540 all the colors within the page background color cluster. Furthermore, other colors, within the scanned document, may be translated 550 smoothly using a rapidly decaying translation vector that decays based on the distance of the color from the page background color. One skilled in the art will recognize that colors outside of the background color cluster may be translated using various techniques known within the art.

If the page color saturation is above the particular threshold, all of the colors should potentially be translated to compensate for the scanned document's strong color saturation level. In one embodiment, all colors within the scanned document are remapped 560 using the page color and the reference white point for the RGB-XYZ-Lab transformation. This transformation allows background removal of image content printed on strongly colored paper. This color transformation process may be accomplished by various methods known within the art.

The removal of background color allows for refinement of the tentatively identified background pixels within the scanned document. In one embodiment, all of the tentative background pixels within the background color cluster are labeled as true background pixels, and the remaining tentative background pixels are labeled as halftone pixels. These halftone pixels may be subsequently removed from the background.

Figure 6:
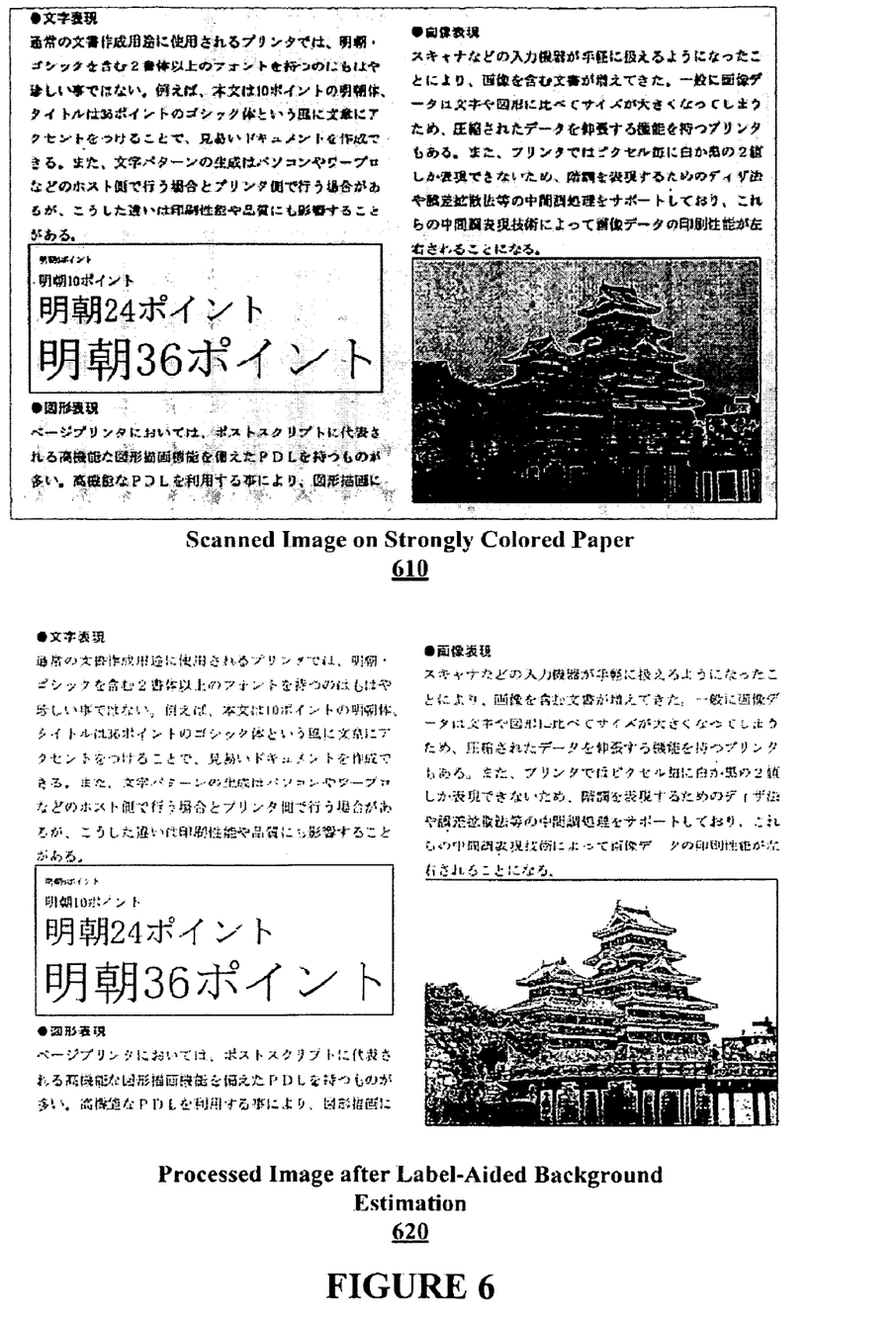
FIG. 6 illustrates documents prior to and after label aided background enhancement according to one embodiment of the invention.

FIG. 6 illustrates an exemplary result of the label-aided background removal described above. As shown, a scanned document on strongly colored paper 610 may result in a grayish background if printed or viewed in a black and white environment. However, by removing the strongly colored background, and to the extent appropriate, mapping other colors to the white background, a sharper image 620 is provided. In a color environment, all image colors are appropriately remapped so that consistent color relationships are maintained with respect to the page background color.

D. Multi-Region Enhancement

Figure 7:
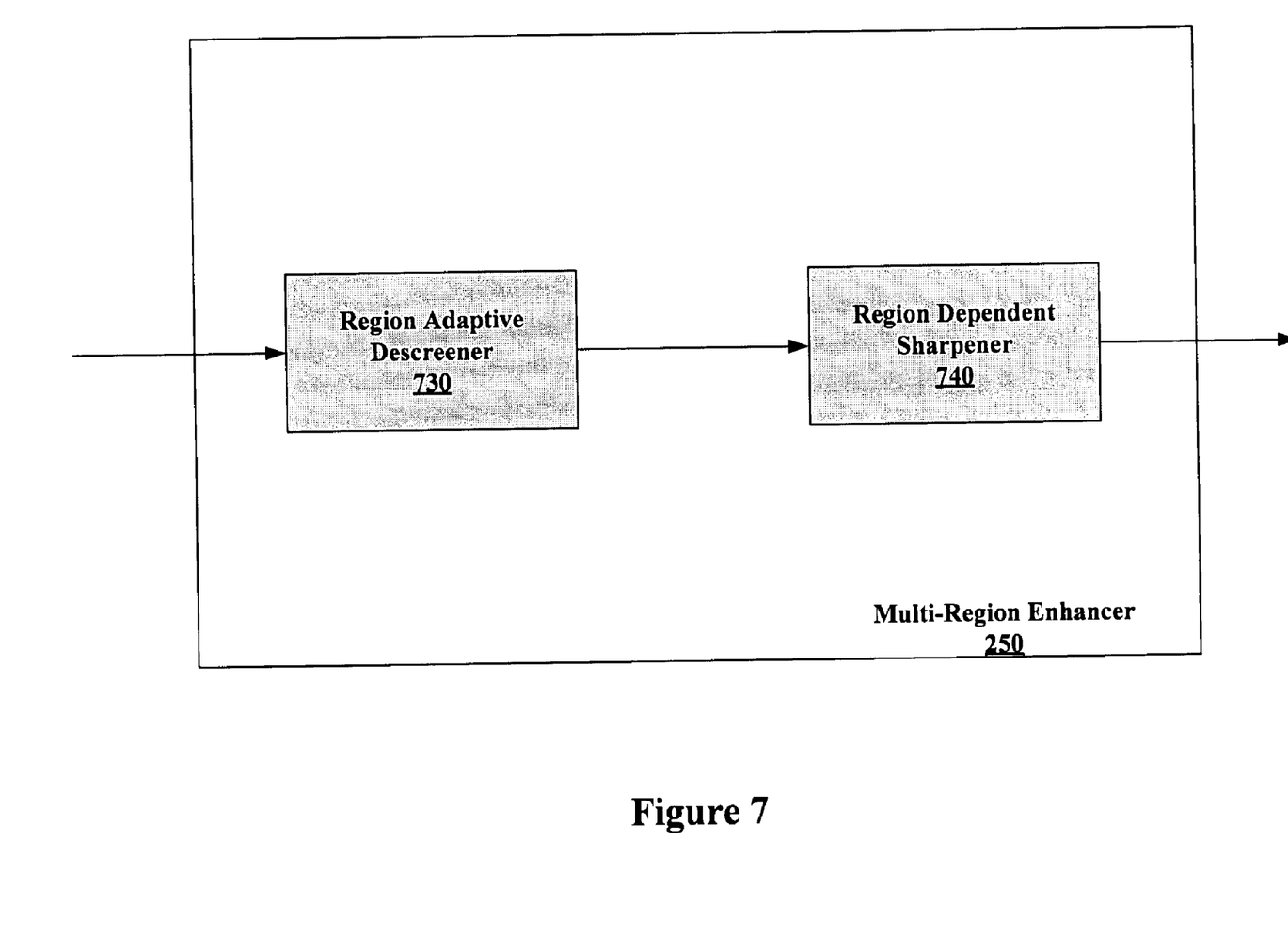
FIG. 7 is a block diagram of a multi-region enhancement module according to one embodiment of the invention.

FIG. 7 illustrates a multi-region enhancer 250 according to one embodiment of the invention. The multi-region enhancer 250 includes a region adaptive descreener 730 and a region dependent sharpener 740. The multi-region enhancer 250 uses the labeled pixels, such as the edge pixels and background pixels, to enhance the content and images in the scanned document.

In one embodiment of the invention, the enhancement occurs in two different stages. In the first stage, the region adaptive descreener 730 removes the halftones within the scanned document using a method such as the one described in FIG. 8. In the second stage, the region dependent sharpener 740 sharpens the image features using techniques known within the art, such as a standard unsharp masking algorithm.

Figure 8:
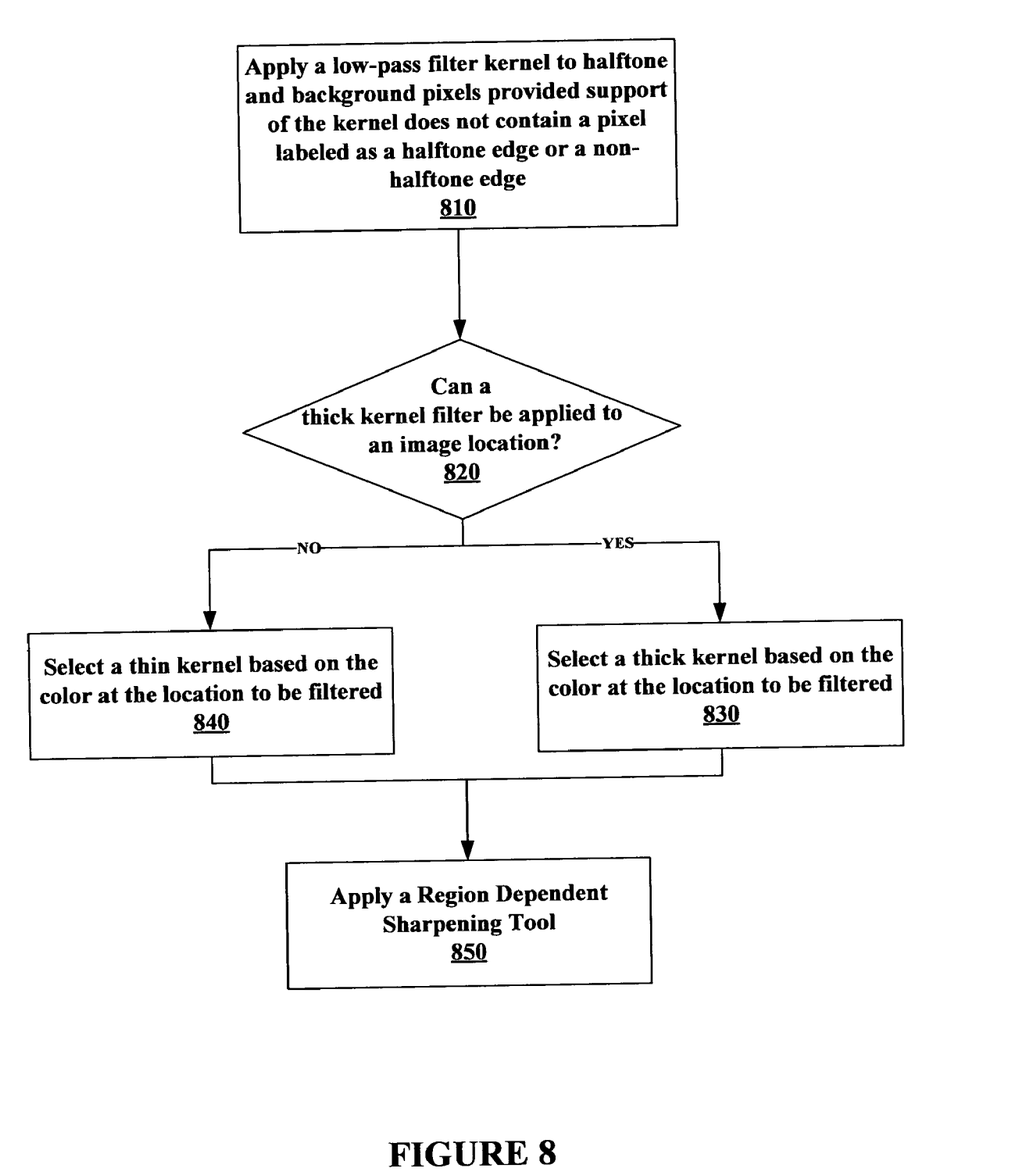
FIG. 8 is a flowchart illustrating a method for multi-region enhancement according to one embodiment of the invention.

FIG. 8 illustrates a method of multi-region enhancement, within a scanned document according to one embodiment of the invention. This enhancement method leverages the labeled regions within the scanned document, and provides region dependent descreening.

A low pass filter is applied 810 to all halftone and background pixels provided the support of the kernel does not contain a pixel labeled as a halftone edge or a non-halftone edge. The remaining unfiltered locations within the scanned document are filtered by one of two sets of oriented filter kernels. (Other sets of oriented filter kernels, having various characteristics, may also be used in other embodiments of the invention.) The first set, denoted as thick kernels, have larger support than the second set, denoted thin kernels. For each unfiltered location, if a thick kernel can be used for filtering, it is used. However, a thick filter may be used at a given location only if its support does not contain any non-halftone edge pixels. Otherwise, a thin filter kernel is used.

A first analysis of a region or image location within the scanned document may be performed to determine 820 whether a thick kernel may be applied. If any thick kernel can be applied, the filtered result may be selected 830 from the output of all the applicable thick kernels based on which output is closest to the color at the image location that is to be filtered.

Comparatively, if a thick kernel cannot be applied to the image location, a thin kernel is selected from all of the available thin kernels. Similar to the application of a thick kernel, if any thin kernel can be applied, the filtered result may be selected 840 from the output of all the applicable thin kernels based on which output is closest to the color at the image location that is to be filtered.

Analogous to sigma-filters, the weight of a given pixel color may be determined by a number of different factors including its spatial distance and its color distance to the pixel at the location to be filtered. Furthermore, instead of using a sharp color-distance cutoff, a decaying function of color distance may be used. One skilled in the art will recognize that other characteristics of a pixel may be considered in selecting an appropriate filter kernel.

In one embodiment of the invention, the input to a filter (e.g., thick or thin kernel) may be selected from the output array of previous filtered pixels whenever it is available. This output array dependent selection allows the use of a filtered estimate of pixel color for subsequent filtering whenever such an estimate is available. Additionally, this approach reduces the risk of inadequate suppression of halftones near halftone edge pixels. Furthermore, this approach may reduce the variance near halftone edge pixels resulting in a more smooth tone appearance.

Once the pixel image regions are filtered, a region dependent sharpening tool is applied 850. In one embodiment, a fast unsharp masking algorithm is used for this sharpening, which may, for example, only sharpen the L channel of the LAB image. Halftone edges and non-halftone edges may also be sharpened by similar sharpening factors to minimize visual artifacts.

The application of these image sharpening methods may result in noise in color regions and/or thickening of text regions within the scanned document. According to one embodiment of the invention, asymmetrical clipping may be performed on the sharpened L channel to minimize this noise and thickening of text regions. The actual level of clipping may vary and be determined using various methods. For example, the level of clipping may be determined by the saturation of the pixel itself. The saturation of a particular pixel may be defined by:

$$s_{Lab} = \sqrt{(a^2 + b^2)}$$

Let $f_{min}$ denotes the clip factor and $f_s$ be a smooth function of $s_{Lab}$ and where:
(1) $f_s$ is zero when $s_{Lab}$ is zero; and
(2) $f_s$ is 1 for a sufficiently large $s_{LAB}$.

The pixel saturation is clipped to the range $[Lf_{min}f_s, 100]$ by sharpening a pixel with this L-value. One skilled in the art will recognize that various clipping techniques may be applied to a saturated pixel.

The processed scanned document can be provided to various applications and devices for enhanced rendering. These devices include various types of printers and display devices. Additionally, the labeled image may be used to switch between screens and tables to improve the rendering of both halftone and non-halftone edges. Furthermore, the labeled image may used to parse a document copy into various components, such as text and images, to facilitate storage or other processing of the document copy.

While the present invention has been described with reference to certain exemplary embodiments, those skilled in the art will recognize that various modifications may be provided. Accordingly, the scope of the invention is to be limited only by the following claims.

What is claimed is:

1. A computer readable medium encoded with instructions for a processor in communication with a device used to create a digital version of a physical medium to perform a method for labeling content regions within a scanned document, the method comprising:
   instructions for a processor to identify edge pixels within a particular region in the document;
   instructions for a processor to determine an edge pixel type for each of the identified pixel edges, wherein a first filter and a second filter are used to determine the edge pixel type;
   instructions for a processor to label the region based on an analysis of the determined edge pixel types within the particular region;
   instructions for a processor to refine the labels within the scanned document comprising the steps of:
      identifying a connected set of non-halftone edge pixels adjacent to a halftone edge pixel; and
      relabeling the connected set of non-halftone edge pixels as halftone edges;
   instructions for a processor to estimate a background region within the scanned document according to an analysis of identified background pixels;
   instructions for a processor to map a background color cluster of the scanned document to a preferred background color of a document copy to be generated; and
   instructions for a processor to translate at least one color, within the scanned document and outside of the background color cluster, using a translation vector in a color space, wherein the translation vector is rapidly decaying translation vector that decays based on the distance of the at least one color from a background color of the scanned document.

2. The computer readable medium of claim 1, wherein at least one pixel gradient calculation is performed to identify edge pixels within the particular region.

3. The computer readable medium of claim 1, wherein the edge pixel type is one of fine edge, coarse edge, or very coarse edge.

4. The computer readable medium of claim 3, wherein the particular region is labeled according to the quantity of fine edge pixels contained therein.

5. The computer readable medium of claim 1, further comprising the step of remapping all of the colors, within the scanned document, using a reference white and a color transformation.

6. The computer readable medium of claim 1, further comprising the step of removing halftone from the background region.

7. The computer readable medium of claim 1, further comprising the steps of:
   performing region dependent descreening on at least one region within the scanned document; and
   sharpening at least one region within the scanned document using a sharpening method associated with a labeled content within the at least one region.

8. The computer readable medium of claim 7, wherein a plurality of filters are available for descreening the at least one region.

9. The computer readable medium of claim 7, wherein asymmetrical clipping is performed to avoid pixel saturation.

10. A system for providing label aided enhancement of a scanned document, the system including a device selected from the group consisting of a network server a computers and a personal data assistant comprising:
   an image labeler, coupled to receive a scanned document, that applies at least two filters to pixels within the scanned document in order to identify information used in labeling content regions in the scanned document;
   a background estimator, coupled to receive information from the image labeler, that compensates for a different background color between that identified in the scanned document and that desired in a document copy;
   a multi-region enhancer, coupled to receive information from the background estimator, that provides region dependent descreening within the scanned document;
   refining the labels within the scanned document comprising the steps of:

identifying a connected set of non-halftone edge pixels adjacent to a halftone edge pixel; and relabeling the connected set of non-halftone edge pixels as halftone edges, estimating a background region within the scanned document according to an analysis of identified background pixels;

mapping a background color cluster of the scanned document to a preferred background color of a document copy to be generated; and translating at least one color, within the scanned document and outside of the background color cluster using a translation vector in a color space, wherein the translation vector is rapidly decaying translation vector that decays based on the distance of the at least one color from a background color of the scanned document.

11. The system of claim 10, wherein the image labeler comprises:

an edge locator that locates at least one edge pixel within a region in the scanned document;

an edge type identifier that identifies an edge type for the at least one edge pixel within the region;

a tentative label assigner that labels the region according to the identified edge type for the at least one edge pixel; and a position refiner that refines the edge position of a non-halftone edge by comparing a fine edge component to a non-halftone edge component.

12. The system of claim 11, wherein the edge locator comprises at least one gradient calculation module that calculates a gradient value corresponding to a plurality of pixels within the scanned document.

13. The system of claim 10, wherein the background estimator maps a background color cluster of the scanned document to a reference white.

14. The system of claim 10, wherein the multi-region enhancer comprises:

a region adaptive descreener that eliminates halftone within the scanned document; and a region dependent sharpener that sharpens content within the scanned document.

15. A computer readable medium encoded with instructions for a processor in communication with a device used to create a digital version of a physical medium to perform a for enhancing a scanned document for subsequent rendering, the method comprising:

instructions for a processor to estimate a background region within the scanned document according to an analysis of identified background pixels;

instructions for a processor to map a background color cluster of the scanned document to a preferred background color of a document copy to be generated; and instructions for a processor to translate at least one color, within the scanned document and outside of the background color cluster using a translation vector in a color space, wherein the translation vector is rapidly decaying translation vector that decays based on the distance of the at least one color from a background color of the scanned document.

* * * * *

UNITED STATES PATENT AND TRADEMARK OFFICE
CERTIFICATE OF CORRECTION

PATENT NO. : 7,557,963 B2
APPLICATION NO. : 11/202720
DATED : July 7, 2009
INVENTOR(S) : Bhattacharjya

Page 1 of 1

It is certified that error appears in the above-identified patent and that said Letters Patent is hereby corrected as shown below:

Column 12, line 12 after "perform a" insert --method--

Signed and Sealed this

Twenty-seventh Day of October, 2009

David J. Kappos
*Director of the United States Patent and Trademark Office*